Figure 1:
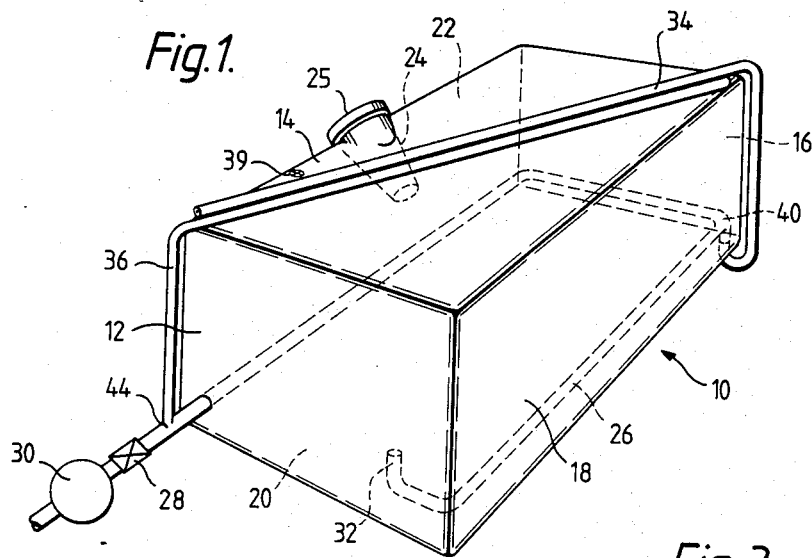

United States Patent [19]

Chinn et al.

[11] Patent Number: 4,492,244
[45] Date of Patent: Jan. 8, 1985

[54] NON-SPILL LIQUID FUEL TANKS

[75] Inventors: Bryan P. Chinn, Bracknell; John S. Armour, Farnborough; Peter M. F. Watson, Basingstoke; Graham L. Donne, Bracknell, all of England

[73] Assignee: Secretary of State for Her Majesty's Government of the United Kingdom and Britain, London, England

[21] Appl. No.: 479,847

[22] Filed: Mar. 28, 1983

[30] Foreign Application Priority Data

Mar. 29, 1982 [GB] United Kingdom ............... 8209227

[51] Int. Cl.³ .................... B65D 25/00; F16K 17/36; F16K 24/04
[52] U.S. Cl. ........................................ 137/38; 137/43; 137/587; 220/85 S
[58] Field of Search ........................ 137/38, 43, 587; 220/85 S

[56] References Cited

U.S. PATENT DOCUMENTS 4,393,980  7/1983  Armour ..................... 137/38 X

Primary Examiner—Robert G. Nilson
Attorney, Agent, or Firm—Cushman, Darby & Cushman

[57] ABSTRACT

A liquid fuel tank for a vehicle is provided with a fuel outlet duct in a circuit about the base of the tank and fuel outlet duct vents connected to the outlet duct and extending above the highest part of the tank. During normal operation of the tank, a non-return air vent allows the flow of fuel from the outlet duct. In the event of an accident, or some other occurrence which results in the tank being tilted, further fuel flow from the outlet duct is cut off by air drawn into the fuel outlet duct from the outlet duct vents. The angle through which the tank must be tilted to allow air from the outlet duct vents to be drawn into the outlet duct may be predetermined by the extent of the circuit about the base of the tank of the outlet duct. Such a non-spill fuel tank, which is self contained in operation, is suitable for use in on-road and off-road wheeled and tracked vehicles, hovercraft, and aircraft which are in danger of being blown over when on the ground.

6 Claims, 7 Drawing Figures

NON-SPILL LIQUID FUEL TANKS

The invention concerns improvements in or relating to non-spill liquid fuel tanks and particularly, but not exclusively, to fuel tanks for vehicles.

Prior art liquid containers have included the type consisting of a tank with a filling duct in the upper surface and an outlet leading from the tank close to the lower surface such as, for example, the fuel tank on a motorcycle.

On a motorcycle, the outlet pipe leads to the carburettor and fuel flows to this by gravity flow.

A problem arises when the motorcycle loses its upright position as, for example, when involved in a collision. In some prior art tanks, fuel is able to continue flowing out of the outlet in this situation and thus create a safety hazard should the fuel become ignited or the engine continue to run.

An improved prior art tank positions the outlet in an area of the tank to which the air gap within the tank is transferred on rotation of the motorcycle onto one side. The carburettor intake is then positioned on the opposite side of the tank to the outlet and has a venting pipe which extends upwards to the maximum-full liquid level in the tank so that an air gap is created in the carburettor on rotation of the motorcycle onto its opposite side.

The above improved tank, however, limits leakages of fuel on rotation of the tank about one axis only.

In some applications there is a requirement to limit leakage on rotation of the tank about more than one axis. A car fuel tank, for example, would require a means for limiting leakage when rotated about two possible axes in order to cover undesirable leakage which may occur as a result of a road accident.

An object of the present invention is to provide a liquid fuel tank having means for limiting leakage of liquid therefrom on rotation of the fuel tank about more than one axis.

According to the present invention there is provided a fuel tank with a filler and a non-return vent arranged to vent the tank when in a generally upright attitude, comprising a fuel outlet duct extending to circuit the base of the tank, a first outlet duct vent having access to the outlet duct and extending to terminate at a position symmetrically disposed across the base of the tank to the access above the highest portion of the tank when in an upright attitude and a second outlet duct vent having access to the outlet duct beneath the position at which the first vent terminates and extending to terminate over the position at which the first vent has access to the outlet duct above the highest portion of the tank when in an upright attitude.

Preferably each outlet duct vent has access to the outlet duct at a point in the circuit which constitutes an extremity of the circuit.

The circuit described by the outlet duct may lie totally external of the tank or totally within the tank or may lie partly external and partly internal of the tank.

Each outlet duct vent may extend not only to a position external of the tank symmetrically disposed across the base of the tank to the access, but may extend beyond this point.

The filler may be arranged to allow filling of the tank with fuel up to a maximum-full level which is less than the capacity of the tank so as to ensure the presence of an air space within the tank at all times in normal usage.

The fuel outlet duct preferably has access to the interior of the tank at a position which lies at an extremity of the wall of the tank.

The container may comprise a fuel tank for a vehicle, particularly a vehicle having more than two wheels.

The outlet duct may be connected to a carburettor and may do so either to allow fuel to reach the carburettor by gravity flow or may be connected to the carburettor via a pump.

The configuration of the length of the outlet duct around the base of the tank may be arranged either to give a predetermined relationship between rotation angle of the tank and fuel flow cut-off point or may, for ease of construction, conform to the outline of the tank.

Figure 2:
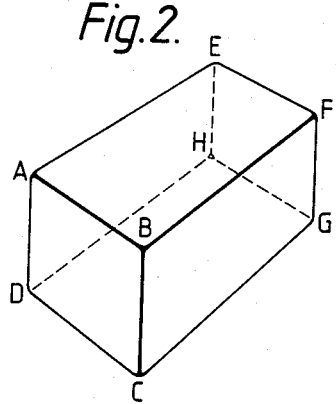

The invention will now be described by way of example only with reference to the accompanying drawings consisting of:

FIG. 1 illustrating a perspective view of a simplified schematic car fuel tank according to a first aspect of the invention, FIG. 2 illustrating a perspective view of a simplified form of the tank of FIG. 1 depicting the basic geometry of the tank, FIGS. 3–6 illustrating application of a series of rotations to the tank of FIG. 2.

Figure 7:
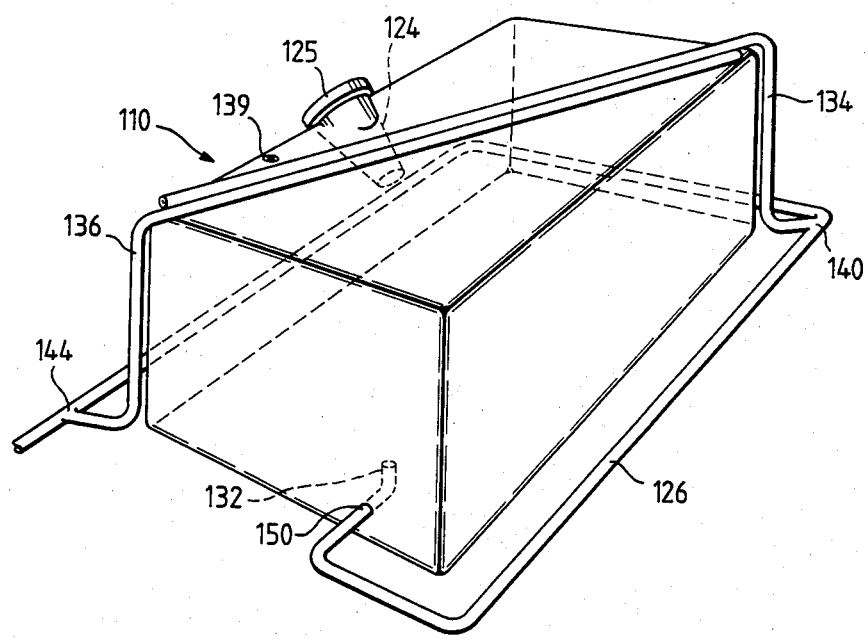

FIG. 7 illustrating a perspective view of a simplified schematic car fuel tank according to a second aspect of the invention.

In FIG. 1 a car fuel tank consists of a box-like drum, 10, the surface of which consists of six walls, 12, 14, 16, 18, 20 and 22. A filler, 24, is situated in the upper part of the drum at the interface between walls 14 and 22. The filler is sealed by a removable cap, 25, and has a short length extending into the drum to enable the drum to be filled with fuel up to a maximum level which coincides with the bottom of the duct. An air space is thereby retained in the drum even when filled to its maximum.

For ease of viewing, the tank of FIG. 1 is shown in an empty condition.

A fuel outlet duct, 26, allows egress of fuel from the tank through a restricter, 28, and under control of a pump, 30.

Referring to FIG. 2, the tank of FIG. 1 is represented by the box as shown with corners at points A, B, C, D, E, F, G and H.

Referring to both FIG. 1 and FIG. 2, the outlet duct, 26, describes a partial circuit within the tank and close to its lower surface, CDHG, passing close to corners C, D, H and G and exiting from the tank through wall 12 close to corner D. The outlet duct, 26, has an open end, 32, adjacent to corner C of the tank through which fuel feeds to the outlet duct and there out of the tank to the pump. The end, 32, is the sole point at which fuel may enter the outlet duct.

The fuel tank additionally includes two outlet duct vents 34 and 36. The duct vent 34 pierces through the wall, 20, and is sealed at point 40 to the outlet duct, 26, at an extremity in the outlet duct's circuit. The duct vent, 34, then leads around the outside of the tank, 10, to a position lying diagonally opposite the corner of the tank nearest to the extremity, 40, of the outlet duct's circuit at which position it terminates in an end which is open to the atmosphere. In this way, duct vent 34 is sealed to outlet duct 26 at point 40 adjacent to corner G of the drum, extending past corner F to corner A at which position it terminates at an open end.

Duct vent 36 is disposed similarly to duct vent 34 except that it does not pierce the wall, 20, of the drum, but is instead sealed to outlet duct 26 at a point, 44, adjacent to corner D of the drum where the outlet duct lies outside the tank wall. Duct vent 36 then extends past corner A to terminate at an open end at corner F.

The interior of the outlet pipe, 26, is accessible to each of venting pipes 34 and 36 at points 40 and 44 respectively where they are sealed to the outlet duct. Free access is thereby available between the outlet duct and the duct vents. In this way, when the tank contains fuel, the fuel rises to a level inside the duct vents which is the same as the level of the fuel inside the tank.

The restricter, 28, is provided in order to prevent the pump pumping fuel from the duct vent 36 in preference to outlet duct 26 in normal usage.

The tank additionally contains a non-return vent, 39, consisting of a valve which allows air to enter the tank to compensate for outflow of fuel through the outlet duct without allowing fuel to pass in the opposite direction.

The tank of FIG. 1 is shown in its normal upright position. The behaviour of the tank when displaced from this position may be considered with reference to both FIG. 1 and FIGS. 3-6.

Figure 3:
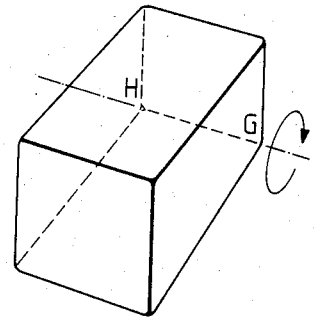

FIG. 3 illustrates clockwise rotation of the tank FIG. 2 about the axis GH.

When the tank is rotated as shown in FIG. 3 it can be seen that any fuel in the tank will tend to flow towards wall 16 of the tank and away from wall 12, thus bringing open end, 32, of outlet duct 26 above the level of the fuel and thereby cutting off the flow of the fuel out of the tank.

Figure 4:
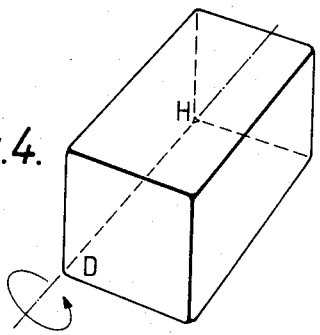

Similarly, if the tank is rotated anti-clockwise about axis DH as shown in FIG. 4, fuel in the tank will tend to flow towards wall 22 of the tank and away from wall 18, thus bringing open end, 32, of outlet duct 26 above the level of the fuel, again cutting off the flow of the fuel out of the drum.

Figure 5:
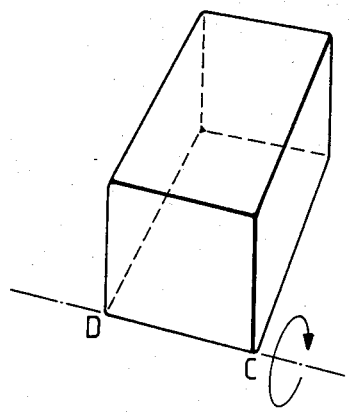

If the tank is rotated anti-clockwise about axis CD as shown in FIG. 5, fuel flows away from wall 16 and towards wall 12, thus bringing point 40 above the level of the fuel. In this way, although end 32 of outlet duct 26 may remain below the level of the fuel in the tank, flow of fuel out of the tank through the outlet duct either by natural siphoning or under the influence of the pump is not possible due to venting of the potential flow route to the atmosphere through duct vent 34.

Figure 6:
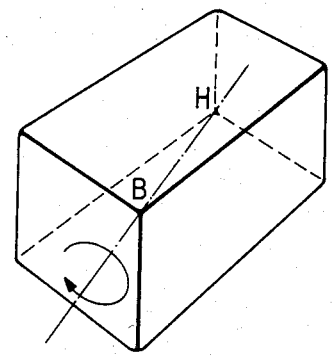

If the tank is rotated clockwise about axis BH as shown in FIG. 6, fuel flows away from interface AD to interface FG, thus bringing point 44 above the level of the fuel. In this way, although end 32 of outlet duct 26 may remain below the level of the fuel in the tank, flow of fuel out of the tank is not possible through the outlet duct due to venting in the atmosphere through duct vent 36.

By considering all possible rotations of the tank about non-vertical axes, it can be seen that, as long as an air space is present within the tank, the fuel flow via the outlet duct will be cut off on any substantial rotation of the tank away from its normal attitude.

A fuel tank according to a second aspect of the invention is depicted schematically in FIG. 7.

The fuel tank of FIG. 7 is similar to that of FIG. 1 and has the tank, 110, with outlet duct 126 having an open end 132 lying within the tank 110 and duct vents 134 and 136 which are sealed to the outlet pipe and points 140 and 144 respectively. The tank contains a filler 124 and cap 125, and has a non-return vent 139.

In the tank of FIG. 7 the outlet duct describes a partial circuit of the tank outside the walls of the tank rather than within its walls as in FIG. 1. In this way, a smaller rotation of the drum about any axis is necessary in order to bring points 140 and 144 above the level of the fuel in the tank than is required to bring points 40 and 44 above the fuel level in FIG. 1. Fuel flow from the tank of FIG. 7 is therefore more sensitive to displacement of the tank away from its normal upright position than is the flow from the tank of FIG. 1.

In FIG. 7, piercing of the tank walls is necessary at only one point indicated at number 150, whereas piercing is necessary at three points in FIG. 1. The FIG. 7 construction would therefore be preferable where piercing creates difficulties e.g. in fabrication or in increasing the possibility of leakage. Additionally, since the outlet duct of FIG. 7 lies wholly outside the tank maintenance is relatively easy e.g. for unblocking any blockages, repairing damaged sections or faulty seals with the duct vents. However, the presence of the outlet duct outside the tank also increases its probability of being damaged as compared to the probability of damaging a duct which lies wholly within the tank as in FIG. 1.

Each duct vent shown in both FIGS. 1 and 7 is sufficiently long to reach a first point on the tank diagonally opposite a second point of the tank which is the point of the tank nearest to where the duct vent is sealed to the outlet duct. Each duct vent may, however, extend beyond this first point in order to decrease the probability of leakage from the duct vent on a rotation of the tank which results in fuel flow towards the second point. Alternatively, the duct vent may be made shorter provided that its open end lies above the level of the fuel in the tank even when filled to a maximum level when the tank is rotated so that the second point is the lowest-lying point of the tank. Where the filler is arranged so that the tank contains air at all material times, even when filled to its maximum level, each duct vent could be thus arranged to extend to a point short of this first point.

The fuel tank may be incorporated in a car and so provide a safety measure in limiting potentially dangerous flow of fuel from the tank when the car becomes displaced from its normal upright position, for example after the car is involved in an accident.

The invention is not confined to the details of the above embodiments.

The invention may be applied to closed liquid containers other than fuel tanks in which it is required to stop flow from an outlet on displacement of the container away from an upright position.

The relationship between rotation angle of the container about any axis and the fuel flow cut-off point may be determined by the configuration of the outlet duct around the base of the tank. Thus, the further away from the centre of the container which the outlet duct reaches in any direction, the smaller the angle of rotation necessary to bring the outlet duct above the fuel level on rotation of the container about an axis lying at an angle to that direction. Any desired fuel cut-off profile may therefore be arranged by providing a circuit configuration accordingly.

The tanks of FIGS. 1 and 7 have rectilinear, box-like shapes. However, any shape of container may be used.

The outlet pipe circuit on FIGS. 1 and 7 is shown as planar and either wholly inside or wholly outside the tank. A more generalised outlet pipe may, however, be non-planar and may lie partially inside and partially outside the tank.

Two duct vents are shown in FIGS. 1 and 7 and all duct vents are positioned at extremities of the outlet duct corresponding to corners D, C, G and H. More duct vents may, however, be provided and may not all be positioned at extremities of the circuit.

Where the outlet duct takes up a convex curved configuration, for example a circular configuration, each point of the curve may constitute an extremity. In order to avoid providing a duct vent at each point of the curve, therefore, duct vents may instead be positioned at predetermined intervals along the curve.

If it is not required to minimise the rotation angle required to induce cut-off liquid flow, the duct vents may be positioned at points in the outlet duct which do not constitute extremities.

We claim:

1. A fuel tank comprising, in combination a top, a bottom and opposite side walls defining a container, fuel inlet means having a closure, air vent means comprising a non-return vent arranged to vent said container when in a generally upright attitude, fuel outlet means comprising a fuel outlet duct extending to circuit said bottom wall of said container, a first fuel outlet duct vent means, said first fuel outlet duct vent having access to the fuel outlet duct and extending to terminate at a position symmetrically disposed across the bottom wall of the container to the access to the outlet duct, above the highest portion of said top wall, when the container is in an upright attitude, and a second fuel outlet duct vent means, said second fuel outlet duct vent having access to the fuel outlet duct beneath the termination of the first outlet duct and extending to terminate over the position at which the first outlet duct vent has access to the outlet duct, above the highest portion of said top wall, when the container is in an upright attitude, whereby fuel contained in said container is displaced from said fuel outlet duct by air drawn into the fuel outlet duct from the outlet duct vents when said container is tilted from a generally upright attitude, preventing the unwanted escape of fuel from the fuel outlet duct.

2. A fuel tank as in claim 1 having three or more outlet duct vents, the accesses to the outlet duct being substantially equispaced along the outlet duct and each outlet duct vent extending to terminate at a position symmetrically disposed across the bottom wall of the tank to its access, above the highest portion of the top wall of the tank when in an upright attitude.

3. A fuel tank as in claim 1 having the first and second outlet duct vents with access to the outlet duct at opposite extremities of the circuit of the fuel outlet duct about bottom wall of the tank.

4. A fuel tank as in claim 2 in which two of the outlet duct vents have access to the outlet duct at opposite extremities of the fuel outlet duct about the bottom wall of the tank.

5. A fuel tank as in claim 1 in which the filler has access to the interior of the tank below the highest portion of the top wall of the tank when in an upright attitude.

6. A fuel tank as in claim 2 in which the filler has access to the interior of the tank below the highest portion of the top wall of the tank when in an upright attitude.

* * * * *